United States Patent
Padovani

(10) Patent No.: US 6,851,918 B2
(45) Date of Patent: Feb. 8, 2005

(54) HANDLING APPARATUS FOR THERMOFORMED OBJECT STACKS CONSTANTLY HELD IN CORRECT AXIAL TRIM

(75) Inventor: Pietro Padovani, Verona (IT)

(73) Assignee: ISAP OMV Group SPA, Parona (Verona) (IT)

( * ) Notice: Subject to any disclaimer, the term of this patent is extended or adjusted under 35 U.S.C. 154(b) by 7 days.

(21) Appl. No.: 10/076,923

(22) Filed: Feb. 14, 2002

(65) Prior Publication Data

US 2002/0110440 A1 Aug. 15, 2002

(30) Foreign Application Priority Data

Feb. 15, 2001 (IT) .................................... VR2001A0017

(51) Int. Cl.⁷ ............................................. B65G 61/00
(52) U.S. Cl. ................... 414/790; 294/99.1; 414/790.2; 414/790.3
(58) Field of Search ............................ 414/416.09, 403, 414/749.1, 749.5, 753.1, 749.6, 790, 790.3, 618, 626, 736, 739, 790.2, 790.5, 790.6; 294/100, 87.1, 99.1

(56) References Cited

U.S. PATENT DOCUMENTS

| 3,491,633 A | 1/1970 | White | |
| 3,619,443 A | 11/1971 | Feldman | .................. 264/89 |
| 3,773,457 A | 11/1973 | Badoux et al. | .................. 425/388 |
| 4,609,339 A | 9/1986 | Padovani | .................. 425/383 |
| 4,997,336 A * | 3/1991 | Galbani | .................. 414/790.2 |
| 5,169,271 A * | 12/1992 | Yamashita | .................. 414/27 |
| 5,234,313 A * | 8/1993 | DelDuca | .................. 414/786 |
| 5,591,463 A | 1/1997 | Padovani | .................. 425/359 |
| 6,290,276 B1 * | 9/2001 | Sherwin | .................. 294/87.1 |

FOREIGN PATENT DOCUMENTS

| DE | 1 432 263 | 11/1968 |
| DE | 1 958 637 | 1/1971 |
| DE | 42 24 009 | 8/1993 |
| DE | 198 12 414 | 9/1999 |
| EP | 0 810 079 | 12/1997 |
| EP | 0 995 582 | 4/2000 |
| EP | 1 075 924 | 2/2001 |

* cited by examiner

Primary Examiner—James W. Keenan
(74) Attorney, Agent, or Firm—Ladas & Parry LLP

(57) ABSTRACT

A handling apparatus for groups of thermoformed object constantly held in a correct axial alignment. The apparatus include at least one picking up and release head having as many receiving seats extending parallel to one another from the head as are the stacks to be handled, and a drive apparatus arranged to move a respective pick up and release head between a stack pick up station and a stack release station of one or more stacks of thermoformed objects and to position it correctly both at the stack pick up station and at the stack release station. At least one mobile pusher member is arranged to engage the stacks of thermoformed objects located in each receiving sear, and control drive apparatus for each mobile pusher member to follow and hold down each stack while each stack is being released from its respective receiving seat.

15 Claims, 3 Drawing Sheets

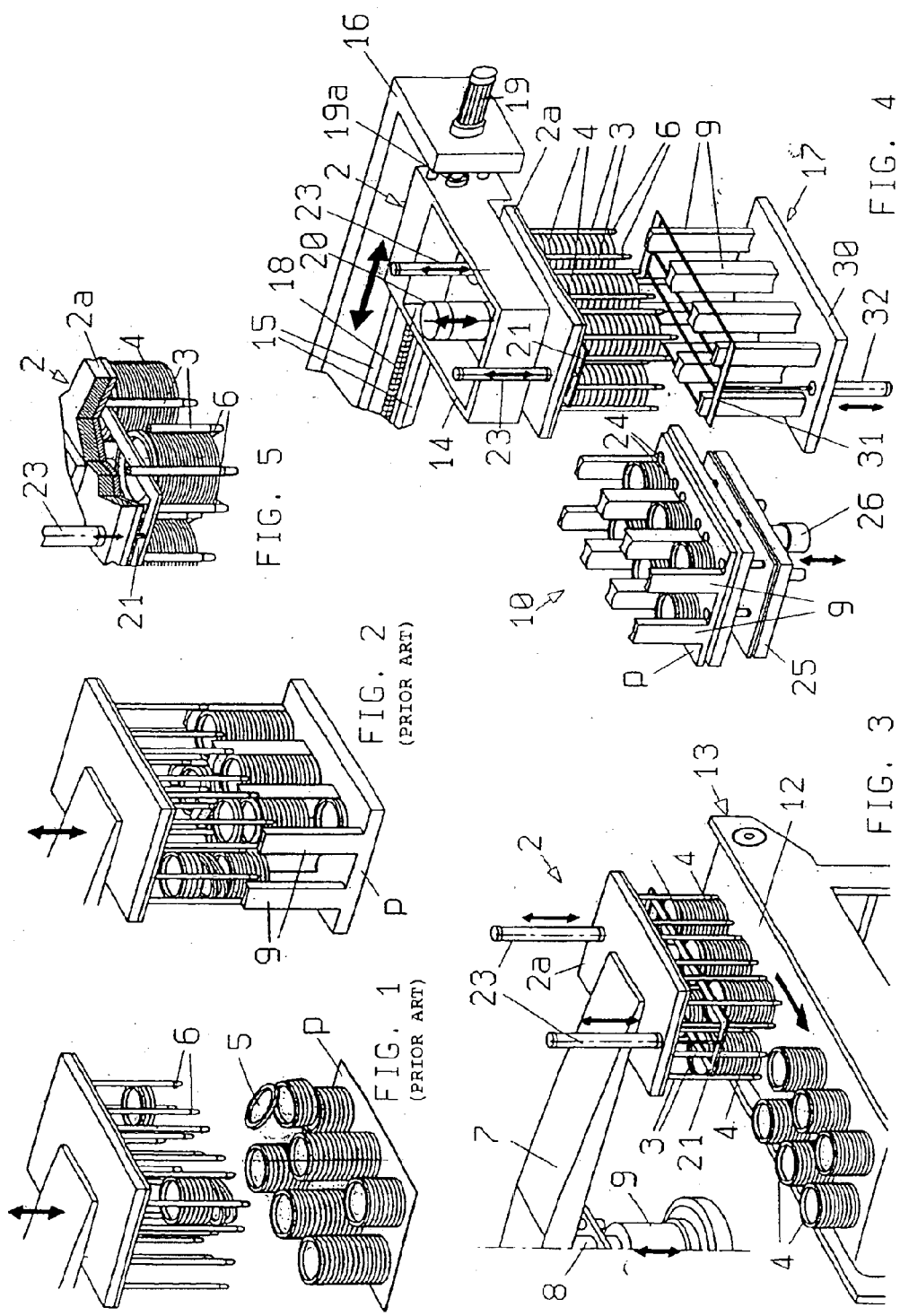

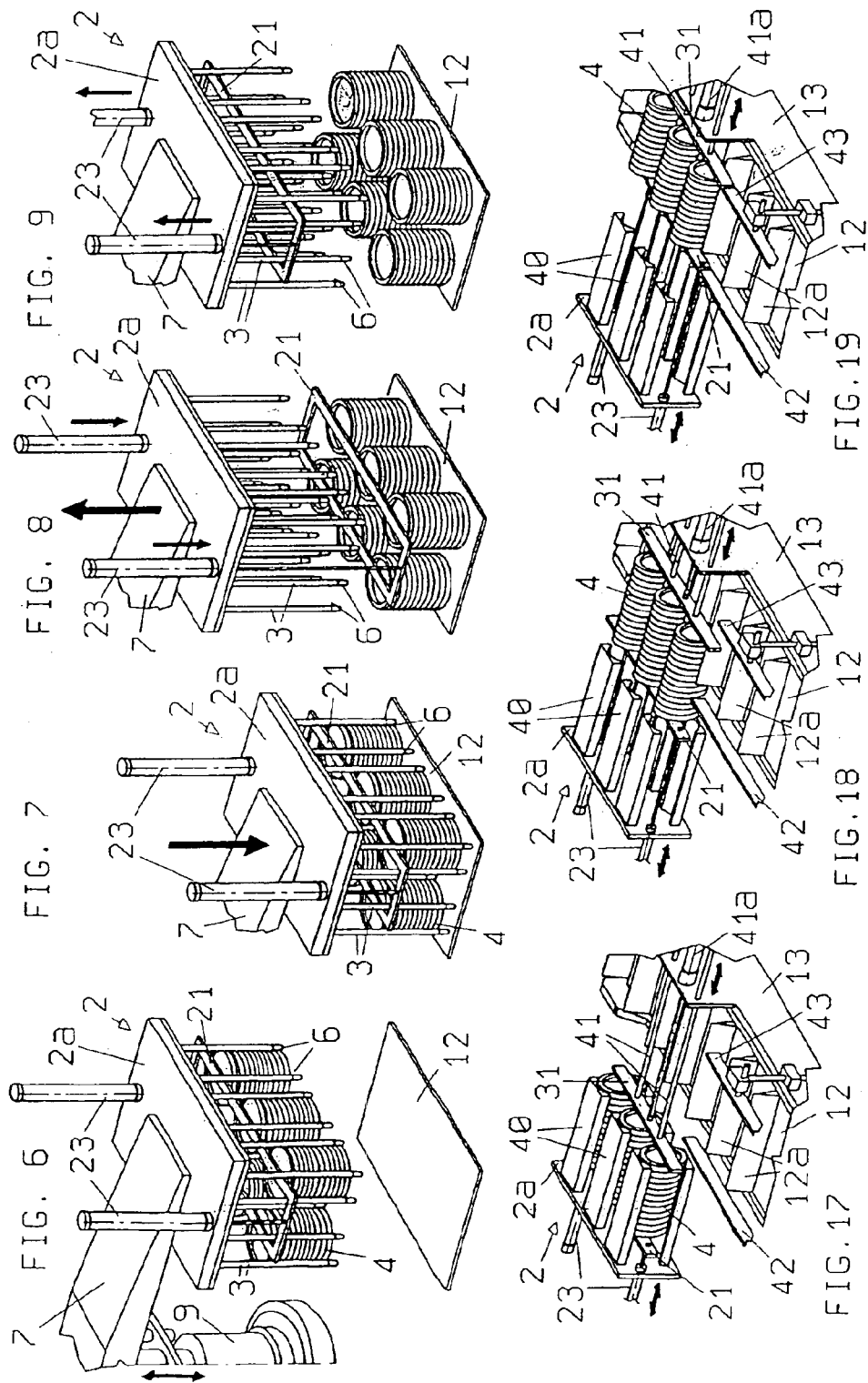

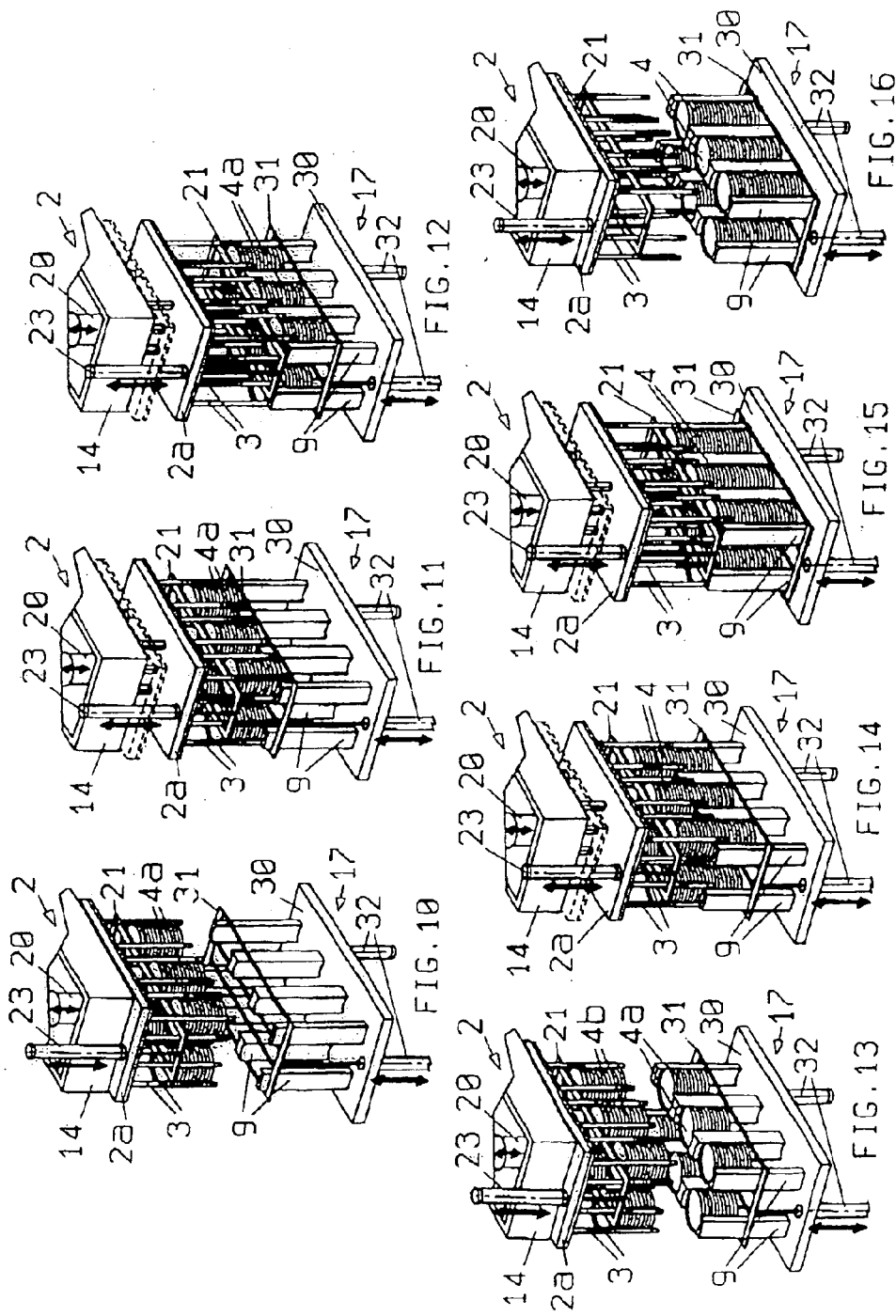

HANDLING APPARATUS FOR THERMOFORMED OBJECT STACKS CONSTANTLY HELD IN CORRECT AXIAL TRIM

BACKGROUND OF THE INVENTION

The present invention relates to a handling apparatus for groups of thermoformed objects constantly held in a correct axial trim.

In the industrial production of thermoformed objects, i.e. containers and lids, by means of a modern thermoforming press, once the moldings of objects have been stacked at a stacking station, the serious problem exists of moving away the already formed stacks with the required rapidity, but without modifying the trim or the axial alignement thereof, within the cycle times of the thermoforming press in order to avoid dead times and to keep a constantly high productivity of the press.

As is shown in FIGS. 1 and 2 in the accompanying drawings that illustrate one release or laying phase of a group of stacks 4 of thermoformed objects 5 drawn from a stacking device and located in cages of hooking rods 3 provided with supporting retractable hooks or spikes 6, laying of the stacks can occur either onto a plane (fixed or movable) p (See FIG. 1) or onto a plate p having a series of vertical guides g for locating stacks as shown in FIG. 2. As a matter of fact, breaking down of the stacks occurs rather frequently since some thermoformed objects 5 can become arranged in an untidy way between the hooking rods 3 during release thereof, which can result in uncomplete release of the stacks or in release and laying of untidy stacks that would create quite serious problems) as will be easily understood, in successive handling operations of the stacks.

SUMMARY OF THE INVENTION

The main object of the present invention of the present invention is to provide a handling apparatus for groups of stacks which can assure keeping of the correct axial alignment of the single stacks as well as their mutual spacing while being transferred from a stacking or stack storing station to a stack receiving or release station.

Another object of the present invention is to provide a handling apparatus for stacks of thermoformed objects that is of high efficiency and practical use so as to be suitable to operate in synchronization and within cycle times of a thermoforming machine.

These and other objects which will be better apparent hereinafter are attained by a handling apparatus for groups of thermoformed objects constantly held in a correct axial alignement according to the present invention, which apparatus includes at least one pick up release head having as many receiving seats extending parallel to one another from said head as are the stacks to be handled, and a drive apparatus arranged to move a respective pick up and release head between a stack drawing station and a stack release station of one or more stacks of thermoformed objects and to position it correctly both at the said stack drawing station and at the said release station, and is characterized in that it comprises at least one mobile pusher member arranged to be moved between, and parallel to, the said receiving seats in order to engage at the top thereof the stacks of thermoformed objects located in each receiving seat, and control drive means for each mobile pusher member, thereby following and hold down each stack while the same is being released from its respective receiving seat.

Advantageously, an equipped receiving member is provided at the said release station for receiving the stacks released from the picking up head.

BRIEF DESCRIPTION OF THE DRAWINGS

Further aspects and advantages of the present invention will better appear from the following detailed description of some presently preferred embodiments thereof, given with reference to the accompanying drawings, in which:

FIGS. 1 and 2 each show a detail on enlarged scale of a pick up or drawing and transfer head in accordance with the prior art and some typical breakdowns in stacks while being released from the hooking rods;

FIG. 3 illustrates a first embodiment of a handling apparatus for groups of stacks of thermoformed objects according to the present invention having rotatable picking up and release head, the stacks being loaded onto a resting surface;

FIG. 4 shows a diagrammatic perspective view of a second currently preferred embodiment of a handling apparatus for groups of stacks according to the present invention having a picking up and transfer head for stacks of thermoformed objects, which can move on a straight path for releasing stacks on an equipped plate;

FIG. 5 is a diagrammatic perspective view of a detail on an enlarged scale of a pick up head of a stack handling apparatus according to FIGS. 3 and 4;

FIGS. 6 to 9 show the sequence of laying or releasing a plurality of stacks of thermoformed objects onto a receiving surface by means of a pick up and release head according to FIG. 3;

FIGS. 10 to 16 are each a diagrammatic perspective view of a pick up head of an apparatus according to FIG. 4 and show the operating sequence of a release and laying of a plurality of stacks of thermoformed objects onto an equipped plate; and FIGS. 17 to 19 illustrate a third embodiment of a handling apparatus for stacks of thermoformed objects, in which the pick up head releases groups of stacks in a substantially horizontal, rather than vertical, direction onto a carry away conveyer for the stacks.

In the accompanying drawings the same or similar parts or components have been indicated by the same reference numerals.

DESCRIPTION OF THE PREFERRED EMBODIMENTS

With reference first to FIGS. 3 to 5, it will be noted that a handling apparatus for stacks 1 of thermoformed objects according to the present invention comprises a moving pick up-release head 2 having a plate 2a equipped with six groups of four hooking rods extending downwardly parallel to one another from the plate 2a. Each group of hooking rods 3 delimits a receiving seat arranged to locate and support a respective stack 4 of thermoformed objects, e.g. lids 5, as is shown in the drawings. Each hooking rod 3 is provided at its lower free end with a retractable hook 6, which may be pneumatically remotely controlled to come out from, and retract into, its respective rod, as is well known in the art.

In FIG. 3 the plate 2a is upwardly secured, e.g. bolted, to the free and of a overhanging support arm 7, which in turn is supported on the top, e.g. keyed, of a vertical output shaft 8 mounted for rotation in a support case 9, which preferably also locates a reversible motor-reduction gear group (not shown in the drawings, but of any suitable type). The support case also locates a vertically raising-lowering device (not shown in the drawings, e. g. a double acting jack) arranged to cause the overhanging arm 7, and thus the pick up-release head 2, to raise and lower vertically. The prearranged and combined motion of rotation and the raising-lowering motion results in the support arm 7 causing, in use, the pick up-release head 2 to move between a picking up station, e.g. at a stacking device 10 (see FIG. 4) for picking up a plurality of stacks 4 of thermoformed objects 5 and a release station where the stacks 4 of thermoformed objects are laid, such as onto a flat tape 12 of a tape conveyer 13 shown in FIG. 3.

In the embodiment illustrated in FIG. 4 the plate 2a of the pick up and release head 2 is secured underneath a support frame 14 which is supported, e.g. in an overhanging fashion, by a pair of sliding guides 15, that in turn are carried by a fixed U-shaped crosspiece 16. The frame 14 can be driven to effect to and from movements or strokes between a stack pick up station 10 and a stack release station 17 by means of a linear actuator, e. g. of the type comprising a screw 18 driven by a reversible motor-reduction gear group 19 and nut screw 19a formed or secured to the frame 14.

Moreover, the plate 2a can effect straight vertical movements owing to the action of a linear actuator, e. g. comprising a pneumatic double acting cylinder and piston group 20, which is arranged to lower and lift the plate 2a at the pick up station 10 and the release station 17.

Both in FIG. 3 and FIG. 4 among the hooking rods 3 there is provided one or more moving pushers 21, e.g. in the form of a grid or frame mounted or supported in such a way as it can move parallel to the hooking rods 3 in order to engage the top of the stacks 4 of thermoformed objects 5 being located within each group of booking rods 3. To this end, a suitable drive means is provided, e.g. a pair of double acting pneumatic jacks 23, arranged to transmit to the pushers a controlled movement to pursue the stacks 4 of thermoformed objects 5 while the same are being released at the stations 12 or 17.

FIGS. 6 to 9 show the operational sequence followed by the pick up and release head 2 illustrated in FIG. 3 while releasing or unloading stacks 4 of thermoformed objects 5 carried by it. Once the head 2 has been transferred (or while being transferred) onto the receiving surface 12, the pushing frame 21 is moved to rest on top of the stacks 4 of thermoformed objects 5 located in the head 2, then the plate 2a is lowered through the arm 7 by the raising-lowering device seated in the case 9 until the tips of the hooking rods 3 are resting on, or very near to, the receiving surface (see FIG. 7). At this point, the plate 2a with its respective hooking rods 3, owing to the returning action of the raising-lowering device in the case 9, begins to raise, whereas at the same time the hooks 6 are controlled to retract into their respective hooking rods 3 and the pair of jacks 23 pushes the frame 21 to pursue the stacks 4 and hold them suitably pressed downwards, while the stacks slip off the hooking rods lowing to the raising movement of the plate 2a to come to rest on the receiving surface 12 and to keep each stack packed until the hooking rods are fully pulled off (see FIG. 8); after which the frame 21 is lifted by the jacks 23 (see FIG. 9) and the head 2 is moved away from the release station 12 to return to station 10 to be loaded with another group of stacks 4 and to restart the operation cycle.

In the embodiment of FIG. 4 the pick up station 10 is constituted by a stacker of any suitable type, e. g. comprising a plate p, vertical guides g extending therefrom and holes 24 formed close to the guides g for temporary receiving and engaging with the tips of the hooking rods 3 of the picking up-release head 2. Among the guides g stacks 4 of thermoformed objects 5 are obtained in any suitable manner, e.g. owing to the action of a linear actuator 26, as is well known to a skilled person in the art.

The receiving plane at the release or unloading station 17 instead comprises an equipped plate 30, which can have vertical guides g as plate g at the pick up station 10 and has a vertically movable bearing frame or grid 31 and a linear actuator for the frame 31, e. g. comprising a pair of pneumatic jacks 32 whose piston rod is secured to the frame 31 so as to cause the same to effect controlled lifting-lowering strokes.

The operation sequence of the handling apparatus according to the present invention, framed as shown in FIG. 4, is illustrated in FIGS. 10 to 16 according to distinct operational ways, will explained hereinbelow. The head 2 is vertically transferred above the equipped plate 30 located at the release or unloading station 17. The frame 31, while the head 2 is being transferred or immediately after the same has arrived above the plate 30, is lifted towards the head 2, as is shown in FIG. 10.

According to a first way of unloading (see FIGS. 10 to 13) the head 2 carries lengths 4a of stacks to be unloaded onto the plate 30, and thus the frame 31 is moved to a lifted position to receive the lengths 4a, whereas the head 2, within which in the mean time the frame 21 has moved to a rest position onto the stacks lengths 4a, is lowered by the jack 20 until the lengths 4a rest onto the frame 31 underneath (see FIG. 11). At this point the frame 31 is lowered towards an intermediate position, whereas the jacks 23 push the frame 21 downwards so as to hold down the stack lengths 4a well packed (FIG. 12), after which the head 2 is raised and can return to the pick up station 10 to be loaded with a second group of stack lengths 4b and to be then transferred, owing to the drive action of the motor 19, above the plate 30 (FIG. 13), where in the mean times the frame 31 is in a standby condition in its intermediate position corresponding to the height of the coming lengths 4b which are then unloaded with the above described procedure onto the lengths 4a under the pushing action of the frame 21 so as to complete the stacks 4 (FIG. 14).

According to a further way of carrying out unloading or release operations, the head 2 is loaded with complete stacks 4 and unloads them in a single operation, as shown in FIG. 14, always with the pushing action of the upper frame 21 in the head 2 and the frame 31 onto the receiving plate 30, which in each case is lifted from the plate 30, as shown in FIG. 10, to receive the coming stacks 4 and lower them onto the plate 30.

Once the complete stacks 4 are unloaded onto the frame 31 by being pushed by the upper frame 21, the head 2 is lifted, whereas the frame 21 holds down the stacks while being further lowered together with the lower frame 31, that in the mean time comes to rest onto the plate 30 while the hooking rods 3 slip off the stacks (FIG. 15). Finally, the frame 21 is lifted and leaves the stacks 4 and the head 2 can move away from the release station 17, thus leaving on the plate 30 stacks perfectly axially aligned and ready for subsequent handling operations (FIG. 16).

It will be noted that owing to the presence of the frame or grid 21, even in the case in which gravity does not suffice to ensure unloading by fall of all the thermoformed objects in a stack 4, all the thermoformed objects 5 are unloaded from the head 2 in any circumstance and, since they are permanently held down well packed together during the unloading operation, the stacks 4 cannot split up or become otherwise misaligned.

FIGS. 17 to 19 show a handling apparatus according to the present invention having a pick up-release head 2 with a plate 2a laying in a transverse (vertical) plane rather than a horizontal one, as in the above described embodiments, in order to carry out loading and unloading of groups of stacks of thermoformed objects in a direction which differs from the vertical one, and thus even without taking advantage of the gravity for unloading the stacks.

More particularly, the plate 2a is equipped with a multiplicity of pairs of guides 40 delimiting a sliding receiving seat for the stacks 4 and are equal in number to the stacks to be received therein. The guides 40 extend perpendicularly from a face of the plate 2a and a pusher, formed by a cross bar 21 driven by a pair of double acting jacks 23, is arranged to move parallel to them.

The unloading or release station is constituted e. g. by a tape conveyer 13 having a tape 12 provided with parallel partition sectors 12a delimiting (horizontal) cradles for the stacks 4. A resting and guide element, e. g. constituted by a bar 31 extending parallel to the bar 21 (when the latter is in its unloading position) is mounted on the conveyer 13. The bar 31 is supported by a pair of sliding (horizontal) guides 41 and is secured to the piston rod end of a double acting jack 42.

During the unloading operation, the head 2 is moved with its receiving seats in alignement with an equal number of cradles on the conveyer 13, the pushing bar is brought to rest against the stacks 4 loaded in the head 2, after which the pusher 21 and the bar 31 are moved in unison so as to keep the stacks 4 well packed and transfer them onto the conveyer 13. The latter has downstream thereof a pair of fixed sliding guides 42 and 43 extending in the feeding direction of the tape 12 so as constantly to keep the stacks 4 well packed and axially aligned. During unloading in fact the pusher 21 moves forwards until its front is coplanar with the inner face of the guide 42, whereas at the same time the bar 31 moves backwards until its front face is coplanar with the inner face of the guide 43. The bars 21 and 31 remain in this aligned position with their respective fixed guide 42, 43 until the tape 12 has moved forward to such an extent that al the stacks 4 unloaded thereon are abutting against the guides 42 and 43, after which the pusher 21 moves back and the head 2 can return to be loaded with stacks 4 to start a new operating cycle.

The disclosure in Italian patent application no. VR2001A000017 filed on Feb. 15, 2001 from which priority is claimed is incorporated herein by reference.

What is claimed is:

1. A handling apparatus for groups of thermoformed objects constantly held in a correct axial alignment, said groups of thermoformed objects being arranged in stacks, which apparatus includes at least one pick up and release head having as many receiving seats extending parallel to one another from said head as there are stacks to be handled, and a drive apparatus arranged to move a respective pick up and release head between a slack pick up station and a stack release station of one or more stacks of thermoformed objects and to position it correctly both at the said stack pick up station and at the said stack release station, and comprises at least one mobile pusher member arranged to be moved between, and parallel to, said receiving seats in order to engage a first end of each of said stacks thermoformed objects located in each receiving seat, and a control drive apparatus for each mobile pusher member, thereby following and holding each stack in said correct axial alignment as a second end of each stack is restrained while each stack is being released from its respective receiving seat.

2. A handling apparatus as claimed in claim 1, wherein said receiving seats are each delimited by at least three hooking rods having retractable abutting hooks and is characterized in that the said mobile pusher member comprises a frame or grid.

3. A handling apparatus as claimed in claim 1, wherein said receiving seats are each delimited by a pair of guides, characterized in that the said mobile pusher member comprises a bar or a grid.

4. A handling apparatus as claimed in claim 1, wherein the said controlled drive means comprises at least one linear actuator.

5. A handling apparatus as claimed in claim 1, wherein the said release or unloading station comprises at least a mobile abutting or resting member and drive means arranged to move the or each mobile resting member to meet and act as a rest for one or more stacks or stack lengths seated and being transferred by said pick up and release head and to move in unison with, but at the opposite side with respect to said pusher member, during stack unloading in order to hold the said stacks or stack lengths packed against the said mobile abutting member, whereas the said pick up and release head slips off the said stacks or stack lengths.

6. A handling apparatus as claimed in claim 5, wherein each mobile abutting or resting member comprises a frame or grid.

7. A handling apparatus as claimed in claim 6, wherein the said mobile abutting or resting member and the said pusher member are movable vertically.

8. A handling apparatus as claimed in claim 7, wherein at least one of said pick up station and said release station comprises a receiving plate equipped with vertical receiving guides.

9. A handling apparatus as claimed in claim 7, wherein the said release station comprises a tape conveyer equipped with parallel guides which are adjustable in position and arranged to keep packed stacks after the same have been unloaded from the said head and wherein the end of the unloading operation the said pusher member and the said mobile abutting member are in alignment with a respective guide until all the stacks unloaded onto said conveyer have been transferred in sliding abutting engagement between the said parallel guides.

10. A handling apparatus as claimed in claim 6, wherein the said mobile abutting or resting member and the said pusher member are movable in a common direction transverse to a direction of movement of said stack or stack lengths away from said release or unloading station.

11. A handling apparatus as claimed in claim 5, wherein each mobile abutting or resting member comprises an abutting bar or plate.

12. A handling apparatus for stacks of thermoformed objects held in a desired axial alignment, said handling apparatus including:

(a) at least one pick up and release head having as many receiving seats extending parallel to one another from said head as there are sticks of thermoformed objects to be handled, said at least one pick up and release head having associated elongate members for retaining said thermoformed objects as stacks in the desired axial alignment, the elongate members having cooperating elements for supporting distal ends of each of said stacks;

(b) a drive apparatus arranged to move said at least one pick up and release head between a stack pick up station and a stack release station and to position the stacks of thermoformed objects correctly both at the stack pick up station and at the stack release station; and (c) at least one mobile pusher member located in each receiving seat and arranged to move relative to said receiving seats in order to (i) engage a proximate end of said stacks of the thermoformed objects and (ii) urge the thermoformed objects in each stack into a well packed arrangement while said elongate members are withdrawn adjacent said stacks at said release station.

13. The handling apparatus of claim 12 wherein the cooperating elements for supporting distal ends of each of said stacks comprise hooks disposed at distal ends of said elongate members.

14. The handling apparatus of claim 13 wherein the elongate member comprise rods.

15. The handling apparatus of claim 12 wherein the cooperating elements for supporting distal ends of each of said stacks comprise stack supporting surfaces of one or more pusher bars.

* * * * *